(12) United States Patent
Shih et al.

(10) Patent No.: US 9,651,781 B2
(45) Date of Patent: May 16, 2017

(54) HEAD-UP DISPLAY DEVICE

(71) Applicant: AUTOMOTIVE RESEARCH & TEST CENTER, Changhua County (TW)

(72) Inventors: Chun-Yao Shih, Changhua County (TW); Jih-Tao Hsu, Changhua County (TW); Shun-Wen Cheng, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 0 days.

(21) Appl. No.: 14/524,126

(22) Filed: Oct. 27, 2014

(65) Prior Publication Data

US 2016/0048020 A1     Feb. 18, 2016

(30) Foreign Application Priority Data

Aug. 12, 2014 (TW) .............................. 103127582 A

(51) Int. Cl.
    *G02B 27/14*     (2006.01)
    *G02B 27/01*     (2006.01)

(52) U.S. Cl.
    CPC ..... *G02B 27/0149* (2013.01); *G02B 27/0101* (2013.01); *G02B 2027/015* (2013.01); *G02B 2027/0159* (2013.01)

(58) Field of Classification Search
    CPC ............ G02B 27/017; G02B 2027/014; G02B 27/0172; G02B 2027/0123; G02B 2027/0127; G02B 2027/0147; G02B 27/01; G02B 2027/0125; G02B 27/14; G02B 27/0149; G02B 5/10; G02B 27/0176;
(Continued)

(56) References Cited

U.S. PATENT DOCUMENTS 4,859,031 A * 8/1989 Berman ............... G02B 5/3016
                                                       349/11
5,379,132 A * 1/1995 Kuwayama ............ G02B 3/005
                                                       345/7

(Continued)

FOREIGN PATENT DOCUMENTS

CN        203186252 U     9/2013
TW        M426035 U1     4/2012
(Continued)

*Primary Examiner* — Ricky Mack
*Assistant Examiner* — Daniele Manikeu
(74) *Attorney, Agent, or Firm* — Rosenberg, Klein & Lee

(57) ABSTRACT

A head-up display device comprises a reflective mirror mounting bracket having an accommodation space; a reflective mirror arranged on the reflective mirror mounting bracket, receiving a real image and reflecting the real image to generate a reflected image; and a concave imaging mirror mounting bracket accommodating a concave imaging mirror, wherein the concave imaging mirror is coated with an antireflection film on one side and coated with a semi-transmitting film on the other side, reflects the reflected image of the reflective mirror and presents a distant magnified virtual image. The present invention is characterized in a small size; no need to install the device inside the instrument panel system; directly using an existing display device to generate a distant magnified virtual image; and easiness for users to install the device.

12 Claims, 2 Drawing Sheets

(58) Field of Classification Search
CPC ... G02B 27/0101; G02B 19/0028; G02B 7/182; G02B 2027/015; G02B 17/002; G02B 2027/0154; G02B 27/028; G02B 27/2292; G02B 27/0159; G06F 3/013; G06F 3/011; H01S 3/1618
USPC ......... 359/263, 467, 630, 631, 633, 13, 267, 359/872, 627, 864, 850, 838, 867, 365, 359/727, 869; 345/8, 156, 419, 633
See application file for complete search history.

(56) References Cited

U.S. PATENT DOCUMENTS

| | | | | |
|---|---|---|---|---|
| 6,504,518 B1* | 1/2003 | Kuwayama | ............ | G02B 27/01 340/980 |
| 2003/0160736 A1* | 8/2003 | Faso | ............ | G02B 27/01 345/8 |
| 2005/0259034 A1* | 11/2005 | Harada | ............ | G02B 27/0101 345/7 |
| 2008/0278822 A1* | 11/2008 | Choi | ............ | G02B 27/0101 359/631 |
| 2010/0045569 A1* | 2/2010 | Estevez | ............ | G03B 21/10 345/3.1 |
| 2010/0067118 A1 | 3/2010 | Takahashi et al. | | |
| 2013/0077163 A1* | 3/2013 | Shoji | ............ | G02B 27/2235 359/479 |
| 2014/0055865 A1* | 2/2014 | Rossini | ............ | G02B 3/08 359/631 |
| 2014/0218804 A1* | 8/2014 | Tanahashi | ............ | G02B 27/0025 359/630 |

FOREIGN PATENT DOCUMENTS

| | | |
|---|---|---|
| TW | 201245764 A1 | 11/2012 |
| TW | M450512 U1 | 4/2013 |
| TW | 201400329 A | 1/2014 |

* cited by examiner

HEAD-UP DISPLAY DEVICE

This application claims priority for Taiwan patent application No. 103127582 filed at Aug. 12, 2014, the content of which is incorporated by reference in its entirely.

BACKGROUND OF THE INVENTION

Field of the Invention

The present invention relates to a device enabling the driver to view the driving information in a head-up posture, particularly to a simple head-up display device.

Description of the Related Art

Originally, the head-up display (HUD) device is an auxiliary instrument widely used in aircrafts, whereby the pilots needn't head down to view important information.

At first, the head-up display devices were used in military aircrafts to decrease the frequency that the pilots head down to view the instrument panels lest the pilots split attention from flying operation. As the head-up display device is convenient and able to enhance flight safety effectively, more and more civil airplanes were also equipped with the head-up display devices later. Further later, some automobile manufacturers also equipped their automobiles with the head-up display devices to promote the sale of their products.

Nowadays, there are various vehicular head-up display devices available in the market, which can be roughly classified into two types. One type thereof directly projects the images of the display device onto the windshield, having higher energy efficiency and clearer images but lacking sufficient visual distance. Another type uses more optical elements to generate sufficient visual distance, but it requires a brighter light source to offset the light energy lost in the optical elements. The former can be installed by the user easily, but its optical performance cannot satisfy the user. The latter has better optical performance, but the numerous optical elements make it bulky and necessary to be embedded in the instrument panel or the vehicular electronic system. Thus, the user is hard to install the latter by himself.

Accordingly, the present invention proposes a head-up display device to overcome the abovementioned problems.

SUMMARY OF THE INVENTION

The primary objective of the present invention is to provide a head-up display device, which has a small volume and needn't be installed in the instrument panel or the vehicular electronic system, and which utilizes an existing display device to generate a distant magnified virtual image (a virtual image seeming to be projected from a remoter position) and can be installed by the user himself.

Another objective of the present invention is to provide a head-up display device, which can reflect a clear image, neither integrated with the vehicular electronic system (or the instrument panel) nor using a high brightness display device, and which needn't use a special display device that presents an image reversed left and right with respect to the original image for reflection.

To achieve the abovementioned objectives, the present invention proposes a head-up display device, which comprises a reflective mirror mounting bracket having an accommodation space; a reflective mirror arranged on the reflective mirror mounting bracket, receiving a real image and reflecting the real image to generate a reflected image; and a concave imaging mirror mounting bracket, accommodating a concave imaging mirror, wherein the concave imaging mirror is coated with an antireflection film on one side and coated with a semi-transmitting film on the other side, reflects the reflected image of the reflective mirror and presents a distant magnified virtual image.

Below, embodiments are described in detail to make easily understood the objectives, technical contents, characteristics and accomplishments of the present invention.

DETAILED DESCRIPTION OF THE INVENTION

The present invention discloses a head-up display device, which needn't be integrated with the instrument panel or electronic system of the vehicle but can be directly placed before the windshield of the vehicle, and which acquires the driving information from an ordinary display device and projects the driving information onto a concave imaging mirror of the head-up display device, whereby the driver needn't head down to view the driving information on the instrument panel but can directly view the driving information in a head-up posture, wherefore the present invention can effectively promote the driving safety.

Figure 1:
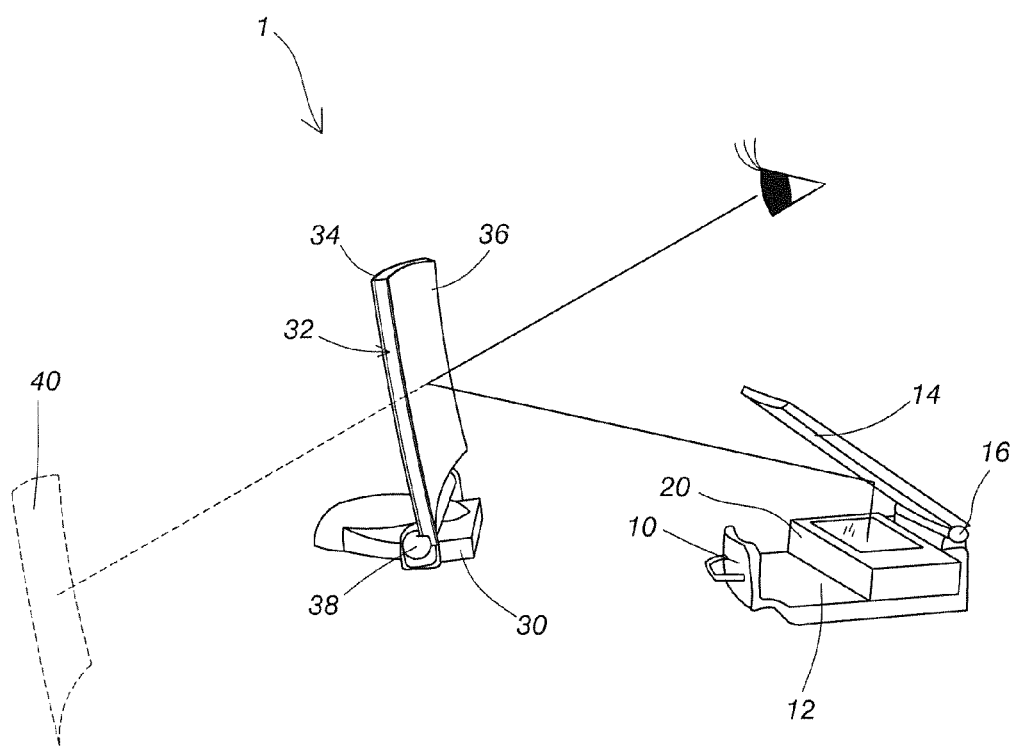
FIG. 1 is a perspective view schematically showing a head-up display device according to one embodiment of the present invention.

Refer to FIG. 1, a perspective view schematically showing a head-up display device according to one embodiment of the present invention. The head-up display device 1 of the present invention comprises a reflective mirror mounting bracket 10 having an accommodation space 12, a reflective mirror 14, a display device 20, a concave imaging mirror mounting bracket 30, and a concave imaging mirror 32. The reflective mirror 14 is arranged on the reflective mirror mounting bracket 10. The reflective mirror 14 is a convex reflecting mirror having a curvature radius of 10-1800 mm. The reflective mirror mounting bracket 10 has a first pivotal axis 16 connecting the reflective mirror 14 with the reflective mirror mounting bracket 10, whereby the user can rotate the reflective mirror 14 with respect to the reflective mirror mounting bracket 10 around the first pivotal axis 16 to adjust the reflection angle of the image. The display device 20 acquires the driving information of the vehicle and presents the real image of the driving information. The display device 20 is arranged in the accommodation space 12 of the reflective mirror mounting bracket 10 and corresponding to the reflective mirror 14, whereby the reflective mirror 14 reflects the real image presented by the display device 20 and generates a corresponding reflected image. In the embodiment shown in FIG. 1, the display device 20 is a smart phone. However, the present invention does not limit that the display device 20 must be a smart phone. In the present invention, the display device 20 may also be another handheld electronic device. The concave imaging mirror 32 is arranged on the concave imaging mirror mounting bracket 30. In the embodiment shown in FIG. 1, the concave imaging mirror 32 is a set of stacked optical elements. The concave imaging mirror 32 has a curvature radius of 10-786.5 mm. The concave imaging mirror 32 has an antireflection film 34 on one side thereof and has a semi-transmitting film 36 on the other side thereof, whereby to receive the reflected image from the reflective mirror 14 and presents a distant magnified virtual image 40 (a virtual image seeming to be projected from a remoter position). The concave imaging mirror mounting bracket 30 has a second pivotal axis 38 connecting the concave imaging mirror 32 with the concave imaging mirror mounting bracket 30, whereby the user can rotate the concave imaging mirror 32 with respect to the concave imaging mirror mounting bracket 30 around the second pivotal axis 38 to adjust the angle of the concave imaging mirror 32. Thus, the concave imaging mirror 32 can receive the reflected image from the reflective mirror 14 and presents the virtual image 40.

An ordinary concave mirror will generate an inverted minified real image while the distance between the object and the mirror is longer than two times the focal length and will generate an upright magnified virtual image while the distance between the object and the mirror is shorter than the focal length. Thus, the present invention places the image inside the focal length to generate the magnified virtual image 40. The magnification is dependent on the distance between the mage and the concave mirror. The abovementioned measure of using a concave mirror to generate a magnified virtual image makes the driver see an image with a distance perception. In the present invention, an aspheric mirror may be used as the concave imaging mirror 32 to avoid optical aberration.

Figure 2:
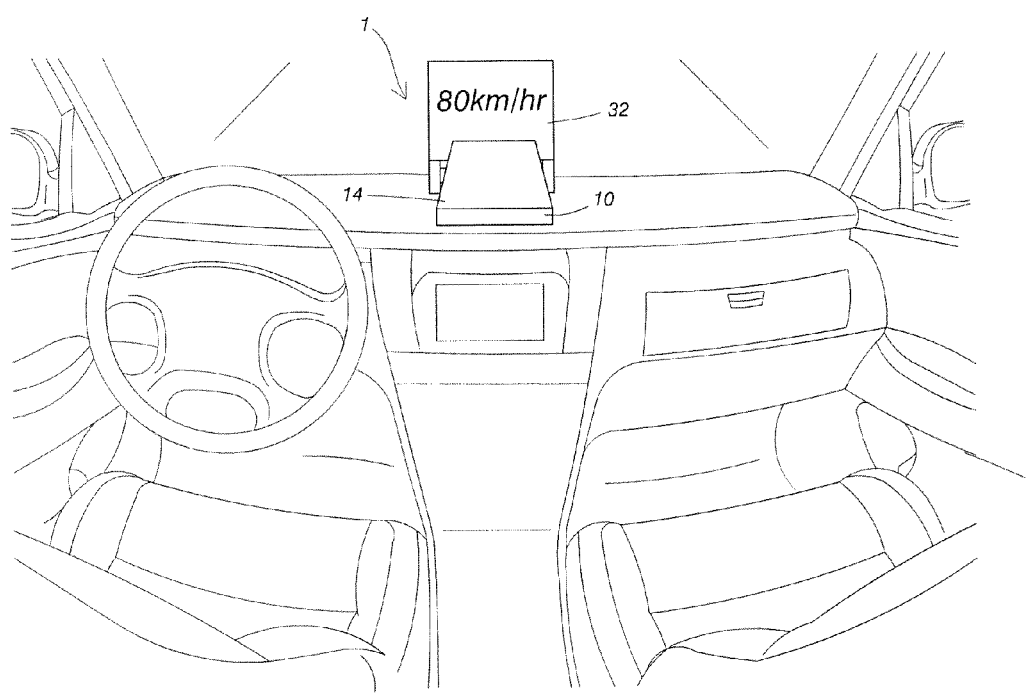
FIG. 2 is a diagram schematically showing an application of a head-up display device according to one embodiment of the present invention.

Refer to FIG. 1 again, and refer to FIG. 2 a diagram schematically showing an application of a head-up display device according to one embodiment of the present invention. In the embodiment shown in FIG. 2, the head-up display device 1 is placed before the windshield of the vehicle, and the display device 20, such as a smart phone, is placed in the accommodation space 12 of the reflective mirror mounting bracket 10. Thereby, the real image generated by the display device 20 is projected onto the reflective mirror 14 and reflected by the reflective mirror 14 onto the concave imaging mirror 32. Thus, the concave imaging mirror 32 presents a virtual image of the real image of the display device 20. Then, the driver can view the driving information in a head-up posture. The driving information includes the driving speed and the driving track. The antireflection film 34 of the concave imaging mirror 32 is used to avoid superimposed images lest the virtual image 40 be blurred. The semi-transmitting film 36 of the concave imaging mirror 32 has a reflectivity of 50%. Thereby, the concave imaging mirror 32 can present the distant magnified virtual image 40.

While the display device 20 is a smart phone, the image of the smart phone (the source image) will have lower brightness. In order to enhance the imaging effect in daylight, the transmittance of the windshield is lowered to 30%, or the reflectivity of the semi-transmitting film 36 of the concave imaging mirror 32 is increased to 70%. Thereby, the present invention can reflect a weaker source image, even the image emitted by the screen of a mobile phone, to form a clear virtual image. The virtual image 40 is generated by two reflection processes. The reflective mirror 14 undertakes the first reflection process to project a first reflected image, which is reversed left and right with respect to the source image, onto the concave imaging mirror 32. The concave imaging mirror 32 undertakes the second reflection process to form the second reflected image, i.e. the virtual image 40. The second reflected image is reversed left and right and inverted top and down with respect to the first reflected image. Thus, the second reflected image (the virtual image 40) is corrected from the left-and-right reversion and resumed to be identical to the source image left and right. Thus, it is unnecessary for the display device 20 to present a source image reversed left and right with respect to the original image. Therefore, an ordinary phone or an ordinary display device can be used as the display device 20 in the present invention.

In conclusion, the present invention proposes a head-up display device having the following characteristics: the present invention occupies only a small space and needn't be installed inside the instrument panel system or integrated with the vehicular electronic system; the present invention can use the existing display device to generate a distant magnified virtual image; the user can install the present invention by himself; the present invention can generate a clear virtual image without using a high-brightness display device; the present invention needn't use a special display device that presents a source image reversed left and right with respect to the original image.

The embodiments described above are only to exemplify the present invention but not to limit the scope of the present invention. Any equivalent modification or variation according to the characteristic or spirit of the present invention is to be also included within the scope of the present invention.

What is claimed is:

1. A head-up display device comprising:
   a reflective mirror mounting bracket including a vertical portion perpendicularly connected to an integrally disposed horizontal portion, both portions defining a recessed accommodation space, a planar surface disposed on the horizontal portion to form a base of said accommodation space;
   a reflective mirror arranged on said reflective mirror mounting bracket, said reflective mirror arranged to receive a real image and to reflect said real image to thereby generate a reflected image; and
   a concave imaging mirror mounting bracket accommodating a concave imaging mirror, said concave imaging mirror coated with an antireflection film on one side and coated with a semi-transmitting film on another side, said concave imaging mirror arranged to receive said reflected image of said reflective mirror and to reflect said reflected image to thereby generate a distant magnified virtual image.

2. The head-up display device according to claim 1, wherein said reflective mirror is a convex reflecting mirror.

3. The head-up display device according to claim 2, wherein said reflective mirror has a curvature radius of 10-1800 mm.

4. The head-up display device according to claim 1, wherein said concave imaging mirror has a curvature radius of 10-786.5 mm.

5. The head-up display device according to claim 1, wherein said accommodation space accommodates a display device arranged on the base of said accommodation space, the display device having a screen arranged corresponding to said reflective mirror and providing said real image for said reflective mirror.

6. The head-up display device according to claim 5, wherein said display device is a smart phone or a portable electronic device.

7. The head-up display device according to claim 1, wherein said reflective mirror mounting bracket has a first pivotal axis connecting said reflective mirror and said reflective mirror mounting bracket and enabling said reflective mirror to rotate with respect to said reflective mirror mounting bracket for adjusting a reflection angle.

8. The head-up display device according to claim 1, wherein said concave imaging mirror is a set of stacked optical elements.

9. The head-up display device according to claim 1, wherein said concave imaging mirror mounting bracket has a second pivotal axis connecting said concave imaging mirror and said concave imaging mirror mounting bracket and enabling said concave imaging mirror to rotate with respect to said concave imaging mirror mounting bracket for adjusting an angle of said concave imaging mirror.

10. The head-up display device according to claim 1, wherein said semi-transmitting film of said concave imaging mirror has a reflectivity of 50%.

11. The head-up display device according to claim 6, wherein said display device is a smart phone, and said semi-transmitting film of said concave imaging mirror has a reflectivity of 70%.

12. The head-up display device according to claim 1, wherein said concave imaging mirror is an aspheric mirror.

* * * * *